United States Patent
Dueck et al.

(10) Patent No.: US 10,088,259 B2
(45) Date of Patent: Oct. 2, 2018

(54) LASER WELDED FIREARM SOUND SUPPRESSORS

(71) Applicant: SureFire, LLC, Fountain Valley, CA (US)

(72) Inventors: Barry W. Dueck, Fullerton, CA (US); Dennis Radgowski, Rancho Cucamonga, CA (US); Kavan Brown, Torrance, CA (US); Karl R. Honigmann, Anaheim Hills, CA (US)

(73) Assignee: SureFire, LLC, Fountain Valley, CA (US)

( * ) Notice: Subject to any disclaimer, the term of this patent is extended or adjusted under 35 U.S.C. 154(b) by 0 days.

(21) Appl. No.: 14/995,654

(22) Filed: Jan. 14, 2016

(65) Prior Publication Data
US 2016/0209152 A1    Jul. 21, 2016

Related U.S. Application Data

(60) Provisional application No. 62/104,354, filed on Jan. 16, 2015.

(51) Int. Cl.
*F41A 21/30* (2006.01)
*B23K 26/282* (2014.01)
*F41A 21/34* (2006.01)

(52) U.S. Cl.
CPC ............ *F41A 21/30* (2013.01); *B23K 26/282* (2015.10); *F41A 21/34* (2013.01)

(58) Field of Classification Search
CPC ......... F41A 21/30; F41A 21/34; B23K 26/282
USPC ......... 89/14.3, 14.4, 14.5; 42/1.06; 181/223; D22/108
See application file for complete search history.

(56) References Cited

U.S. PATENT DOCUMENTS

| | | | |
|---|---|---|---|
| 1,427,802 A | 9/1922 | Goodwin | |
| 3,385,164 A * | 5/1968 | Hubner | F41A 21/30 181/223 |
| 4,291,610 A * | 9/1981 | Waiser | F41A 21/30 89/14.4 |
| 4,576,083 A * | 3/1986 | Seberger, Jr. | F01N 1/08 181/223 |
| 4,907,488 A * | 3/1990 | Seberger | F41A 21/30 181/223 |
| 6,575,074 B1 | 6/2003 | Gaddini | |
| 7,073,426 B1 | 7/2006 | White | |
| 8,100,224 B1 * | 1/2012 | Olson | F41A 21/30 181/212 |

(Continued)

*Primary Examiner* — Bret Hayes
(74) *Attorney, Agent, or Firm* — Haynes and Boone, LLP (57) ABSTRACT

Various techniques are provided to assemble, manufacture, and operate firearm sound suppressors. In one example, a sound suppressor for a firearm includes a baffle; a spacer abutted to the baffle; and a circumferential laser weld joining the baffle and the spacer. In another example, a sound suppressor for a firearm includes a plurality of baffles; a plurality of spacers; a substantially tubular housing surrounding the baffles and the spacers; wherein the housing and the spacers define an annular volume surrounding the spacers; an aperture in a circumfery of at least one of the spacers; and wherein the aperture is adapted to direct combustion gases in a radial direction from within the spacer into the annular volume to reduce ejection port flash of the firearm. Additional suppressor embodiments and related methods are also provided.

23 Claims, 9 Drawing Sheets

(56) References Cited

U.S. PATENT DOCUMENTS

| | | | |
|---|---|---|---|
| 8,820,473 B1 * | 9/2014 | White | F41A 21/30 |
| | | | 181/223 |
| 8,875,612 B1 | 11/2014 | Klett et al. | |
| 2007/0107590 A1 | 5/2007 | Silvers | |
| 2009/0139795 A1 | 6/2009 | Brittingham | |
| 2011/0056111 A1 | 3/2011 | Brittingham | |
| 2011/0297477 A1 | 12/2011 | Koumbis | |
| 2012/0291614 A1 | 11/2012 | Koumbis | |

* cited by examiner

LASER WELDED FIREARM SOUND SUPPRESSORS

CROSS-REFERENCE TO RELATED APPLICATIONS

This application claims priority to and the benefit of U.S. Provisional Patent Application No. 62/104,354 filed Jan. 16, 2015 and entitled "LASER WELDED FIREARM SOUND SUPPRESSORS" which is hereby incorporated by reference in its entirety.

BACKGROUND

1. Technical Field

This application relates to sound suppressors for firearms in general, and in particular, to techniques for assembling components of firearm sound suppressors using laser welding techniques.

2. Related Art

Firearms, such as pistols, rifles, submachine guns and machine pistols, utilize expanding high-pressure gases generated by a burning propellant to expel a projectile from the weapon at a relatively high velocity. When the projectile, or bullet, exits the muzzle end of the weapon's barrel, a bright, "muzzle flash" of light and a high-pressure pulse of combustion gases accompany it. The rapid pressurization and subsequent depressurization caused by the high-pressure pulse gives rise to a loud sound known as "muzzle blast," which, like muzzle flash, can be used by a remotely located enemy to determine both the location of the weapon and the direction from which it is being fired. In some situations, such as typical military operations, it is desirable to conceal this information from the enemy by suppressing the flash and/or eliminating or substantially reducing the amplitude of the muzzle blast.

The use of sound suppressors (also referred to as noise suppressors or silencers) on firearms to reduce the amplitude of their muzzle blasts is well known. Suppressors operate to reduce muzzle blast by reducing and controlling the expansion and energy level of the propellant gases accompanying the projectile as it leaves the muzzle end of the weapon. These devices typically include an elongated tubular housing containing a "stack" of transverse baffles that are longitudinally spaced apart from each other by spacers and that define a plurality of successive internal expansion chambers through which the projectile and expanding gasses pass after the weapon is fired. These chambers serve to control, delay, and divert the flow, expansion, and exhausting of the propellant gases, and also to reduce their temperature, so as to achieve a corresponding reduction in the noise and flash produced by the propellant gases as they ultimately exit the device. The rear (i.e., proximal) ends of these suppressors typically include a mechanism for removably coupling the device to the weapon, and their front (i.e., distal) ends include an opening for the exit of the projectile, and are typically located sufficiently forward of the muzzle end of the weapon that they also effectively operate as a flash hider (i.e., a muzzle flash suppressor).

Conventional methods for assembling the components of a sound suppressor can include providing internal threads in front and rear ends of a tubular housing of the suppressor, and complementary external threads on respective ones of a front plate and a back end member thereof. A back end of the housing is screwed onto the back end member, a stack of alternating baffles and spacers is inserted into the interior of the housing, and the front plate is then screwed into the front end of the housing such that the stack of baffles and spacers is compressed between a front end of the back end member and a rear end of the front plate in a sealed arrangement.

In some implementations, various baffles and spacers may be welded using conventional arc welding or gas welding techniques. However, such conventional welding techniques are problematic for sound suppressor applications. For example, conventional welding techniques typically require the various suppressor components to be exposed to high heat for extended periods of time while each welding operation is performed. This exposure results in associated bending, warping, or other misalignment of the constituent suppressor components. Consequently, a user must realign the components after each weld, typically by applying significant corrective force (e.g., by hammering, bending, or other manipulations). After the components are realigned, another weld is performed, resulting in an associated misalignment and followed by another forced realignment of the suppressor components. These repeated misalignments and associated corrective realignments take significant time (e.g., up to 20 minutes of longer for each suppressor), cause undesirable stress on the suppressor components, and are generally inefficient.

Accordingly, it is desirable to provide new methods for assembling the various components of sound suppressors that are more reliable, accurate, and cost-effective.

SUMMARY

In accordance with the present disclosure, novel firearm sound suppressors are provided, together with methods for assembling them reliably, accurately and in a cost-effective manner using laser welding techniques.

In one example embodiment, a sound suppressor for a firearm includes a baffle; a spacer abutted to the baffle; and a circumferential laser weld joining the baffle and the spacer.

In another example embodiment, a method includes providing a plurality of baffles and spacers of a sound suppressor for a firearm; aligning the baffles and spacers on a fixture to provide an assembly; and operating a laser to provide a circumferential weld joining at least one of the baffles and at least one of the spacers.

In another example embodiment, a sound suppressor for a firearm includes a plurality of baffles; a plurality of spacers; a substantially tubular housing surrounding the baffles and the spacers; wherein the housing and the spacers define an annular volume surrounding the spacers; an aperture in a circumfery of at least one of the spacers; and wherein the aperture is adapted to direct combustion gases in a radial direction from within the spacer into the annular volume to reduce ejection port flash of the firearm.

The scope of the invention is defined by the claims, which are incorporated into this section by reference. A more complete understanding of the sound suppressors of the present invention, together with the novel methods for making them will be afforded to those skilled in the art, as well as a realization of additional advantages thereof, by a consideration of the following detailed description of one or more example embodiments thereof. Reference will be made to the various figures of the appended sheets of drawings, which are briefly described below, and within which like reference numerals are used to identify like elements illustrated therein.

DETAILED DESCRIPTION

In accordance with the present disclosure, novel firearm sound suppressors are provided, together with example methods for assembling them reliably, accurately, and in a cost-effective manner using laser welding techniques.

Figure 1:
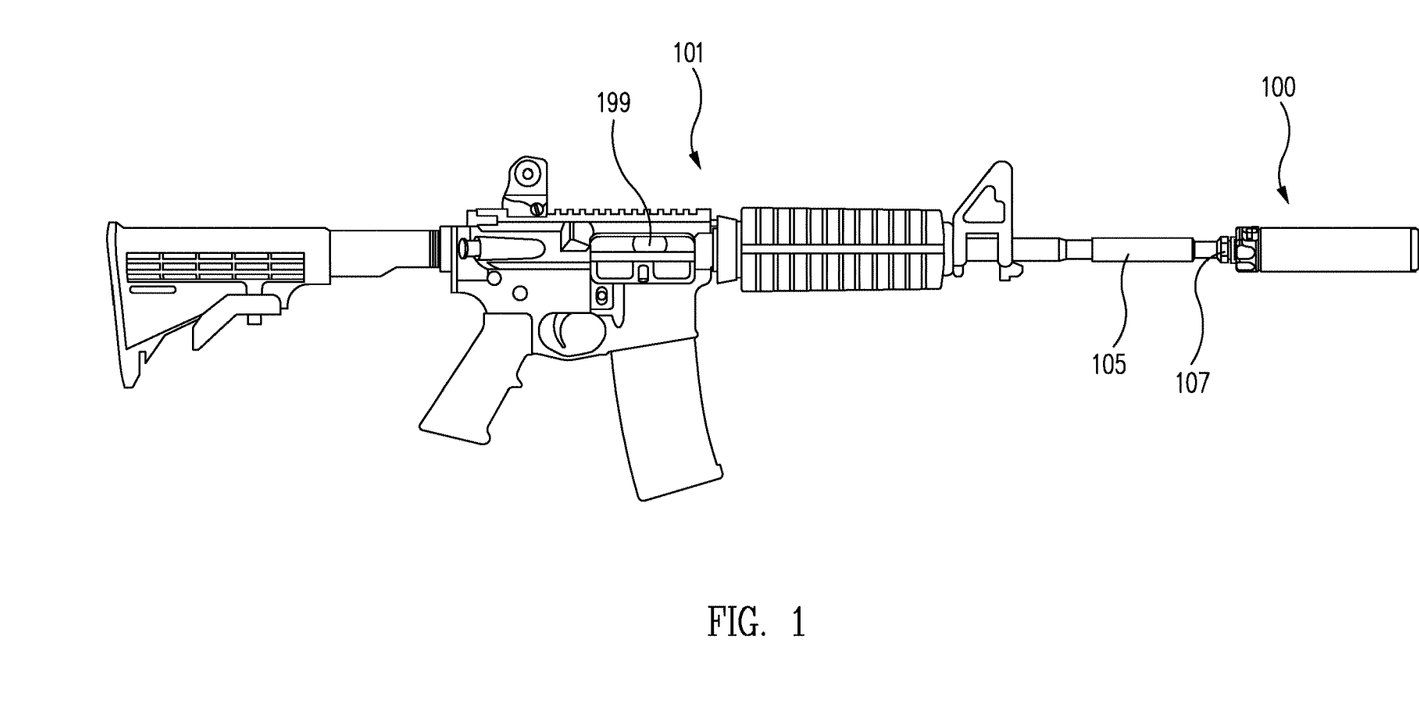
FIG. 1 is a right side elevation view of a firearm having a sound suppressor coupled to the muzzle end of a barrel of the firearm in accordance with an embodiment of the present disclosure.
Figure 2:
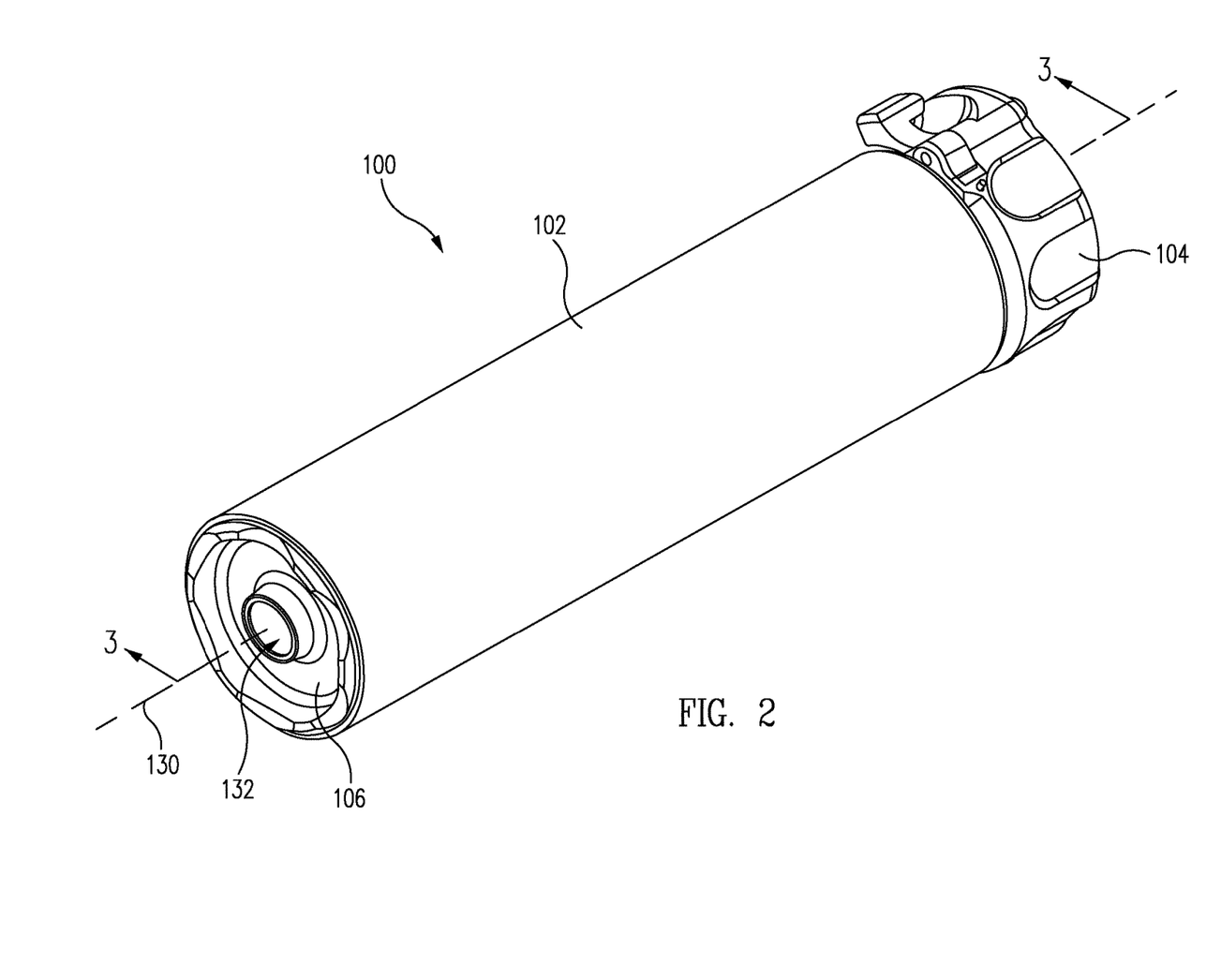
FIG. 2 is a front, upper, and left side isometric view of an example a firearm sound suppressor in accordance with an embodiment of the present disclosure.
Figure 3:
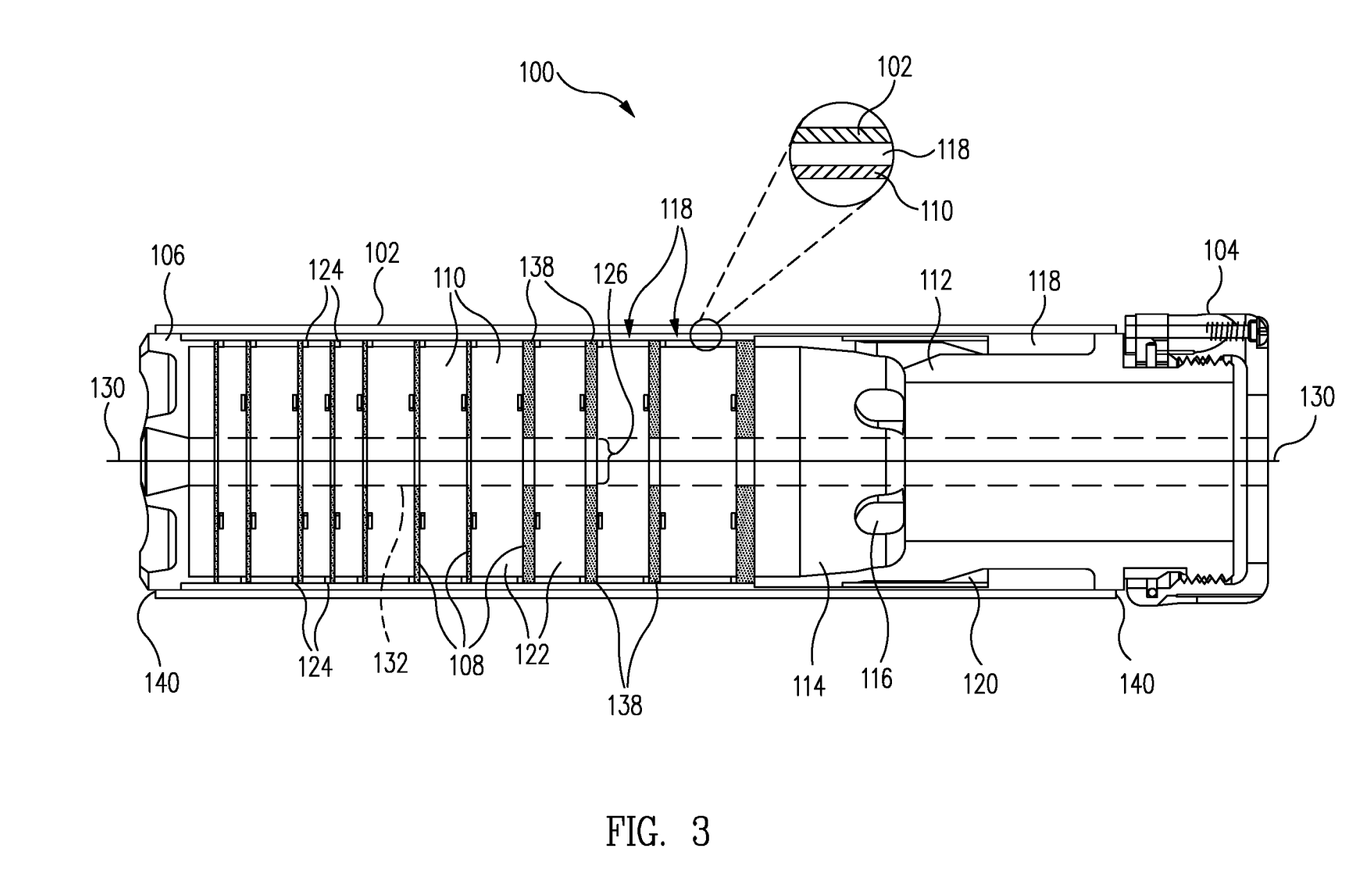
FIG. 3 is a cross-sectional view of the suppressor of FIG. 2, as seen along the lines of the section 3-3 taken therein in accordance with an embodiment of the present disclosure.
Figure 4:
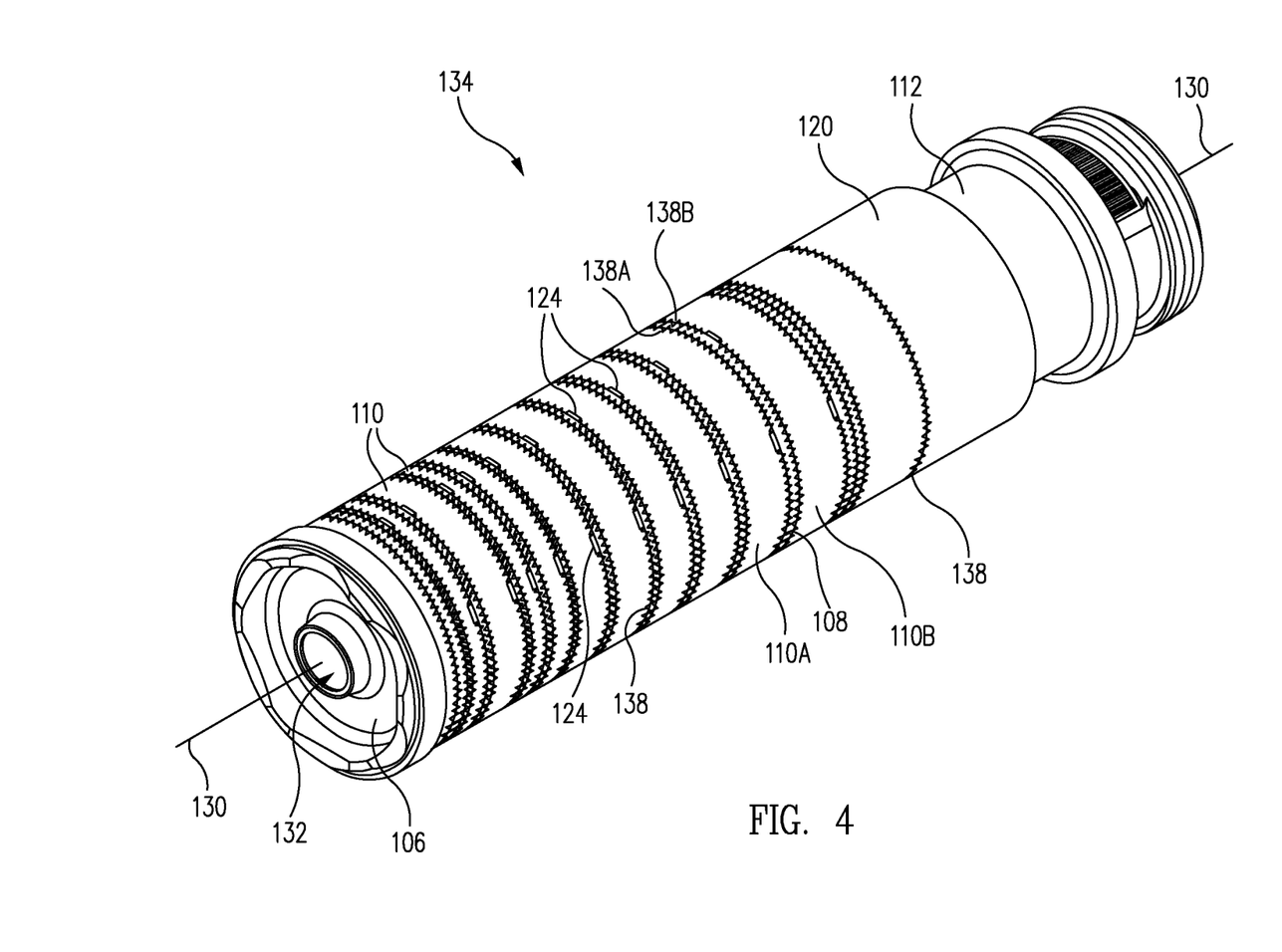
FIG. 4 is a front, upper, and left side isometric view of the suppressor of FIG. 2 with a tubular housing and retaining mechanism both removed therefrom in accordance with an embodiment of the present disclosure.

An example embodiment of a firearm sound suppressor 100 in accordance with the present disclosure is illustrated in FIGS. 1 to 4. FIG. 1 is a right side elevation view of a firearm 101, e.g., a rifle, having a sound suppressor 100 coupled to the muzzle end of a barrel 105 of the firearm 101 in accordance with the present disclosure. FIG. 2 is a front, upper, and left side isometric view of the example suppressor 100, and FIG. 3 is a cross-sectional view of the suppressor 100 of FIG. 2, as seen along the lines of the section 3-3 taken therein. FIG. 4 is a front, upper, and left side isometric view of the suppressor 100 of FIG. 2 with a tubular housing 102 and retaining mechanism 104 both removed therefrom to reveal a welded assembly (e.g., also referred to as a weldment 134) of various components.

As illustrated, suppressor 100 includes a tubular housing 102, a front plate 106, a longitudinal "stack" comprising one or more transverse baffles 108 of various sizes, one or more longitudinal spacers 110 of various sizes disposed at opposite ends of the baffles 108, a back end member 112 (e.g., that permits the suppressor 100 to be coupled, directly or indirectly, to the muzzle of a barrel of an associated firearm), and a retaining mechanism 104 (e.g., to releasably lock the suppressor 100 to the muzzle of a firearm).

In the particular example suppressor 100 of these figures, the back end member 112 defines a gas expansion chamber 114 containing a plurality of radial openings 116 that exhaust hot combustion gases in a radial direction and into an annular gas expansion volume 118 defined between the inner surface of the tubular housing 102 and the coaxially aligned outer surfaces of the baffle 108, spacers 110, and the back end member 112. Ordinarily, this would result in the hot gases impinging directly on the inner surface of the tubular housing 102, which could lead to a premature "blowout" of the wall of the housing 102 in the region of the radial openings 116, particularly during sustained, rapid fire of a weapon to which the suppressor 100 is attached. However, this kind of blowout can be prevented by the provision of a thin blast deflector collar 120 that surrounds the back end member 112 in the region of the radial openings 116, and serves to redirect the hot, expanding combustion gases in rearward direction and into the gas expansion volume 118, thereby avoiding a direct radial impingement on the inner surface of the tubular housing 102. Additional examples of blast deflectors are provided in U.S. Pat. No. 8,505,680 which is incorporated herein by reference in its entirety.

As can be seen in, e.g., FIG. 3, a succession of gas expansion chambers 122 are also defined between successive ones of the longitudinally spaced baffles 108 and within the interior of spacers 110. Like the first gas expansion chamber 114 of the back end member 112, the successive expansion chambers 122 serve to control, delay, and divert the flow, expansion, and exhausting of the propellant gases, as well as to reduce their temperature. As discussed in more detail below, all or selected ones of the baffles 108 and/or the spacers 110 can be provided with apertures 124 to effect longitudinal and/or radial flow of the propellant gases FIGS. 6-9 are front, upper, and left side isometric views of example embodiments of various example spacers 110 that may be used in accordance with the present disclosure. As shown, spacers 110 can comprise relatively short, thin, cylindrical rings or tubes that can be fabricated in a variety of ways. For example, they can be cut in the desired length, which can vary widely within a given suppressor 100 such as, for example, from an extrusion, rolled from a flat sheet having a thickness corresponding to the desired spacer end wall thickness into a cylindrical ring with the opposite ends of the sheet forming a seam that can be closed with, e.g., a seam weld.

Of importance, the front, rear, or both the front and rear ends of the spacers 110 can be formed to incorporate one or more circumferential apertures 124. When an end of a spacer 110 is abutted against an opposing end of an adjacent baffle 108 (see FIG. 5), a radial opening or vent is defined by the aperture 124 and the abutting ends, which can be used to direct combustion gases in a radial direction from the expansion chamber 122 adjacent to the aperture 124 and into the annular space or volume 118 surrounding the baffle/spacer stack (see FIG. 3). In some embodiments, the circumferential apertures 124 may be substantially square or substantially rectangular in shape about the circumfery of spacers 110 and/or may have substantially rectangular or substantially square cross sections (see FIGS. 6 and 7), but it should be understood that other shapes and cross-sections may be used (e.g., semicircular as shown in FIG. 8, v-shaped as shown in FIG. 9, and/or other shapes).

Figure 6:
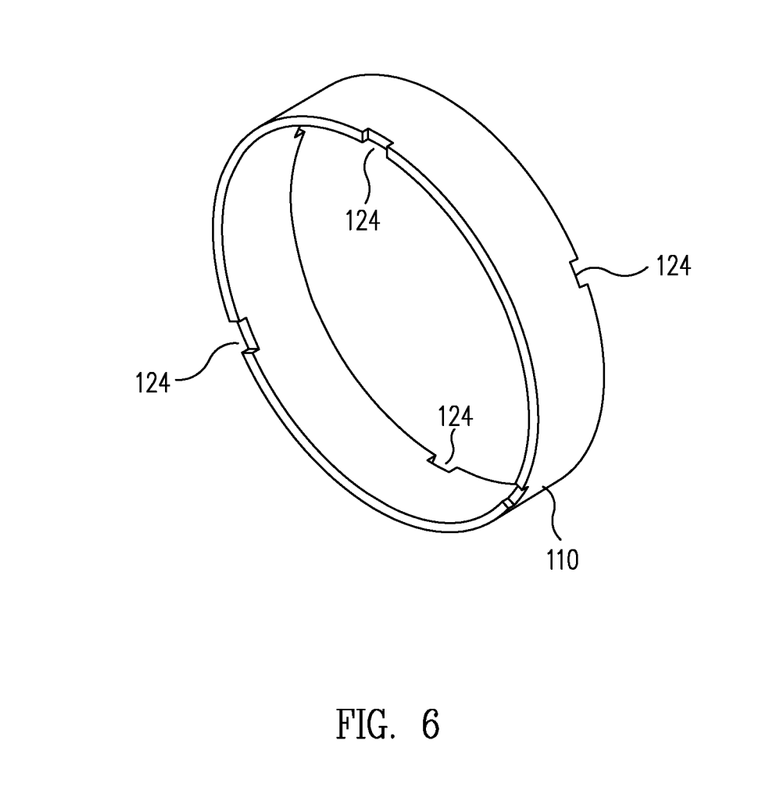
FIGS. 6-9 are front, upper, and left side isometric views of example spacers in accordance with embodiments of the present disclosure.
Figure 7:
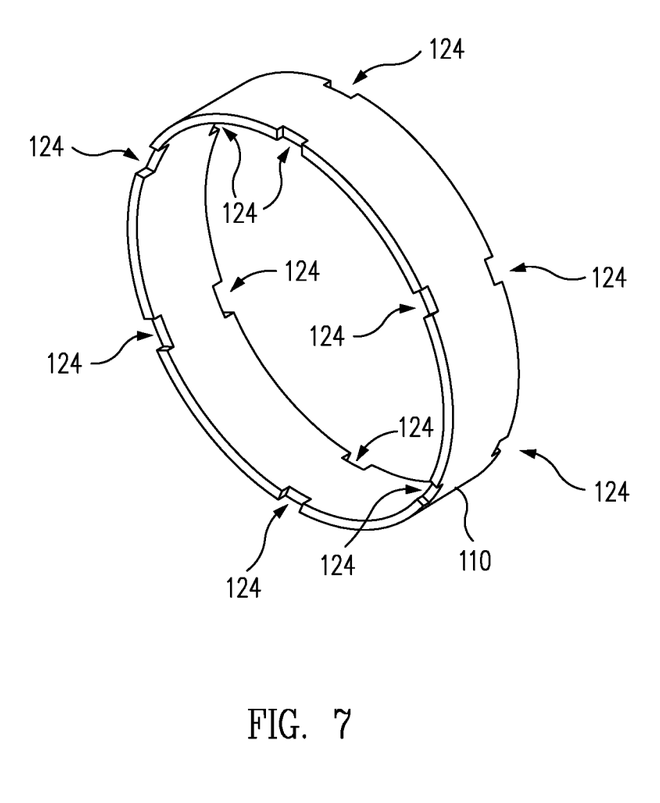
Figure 8:
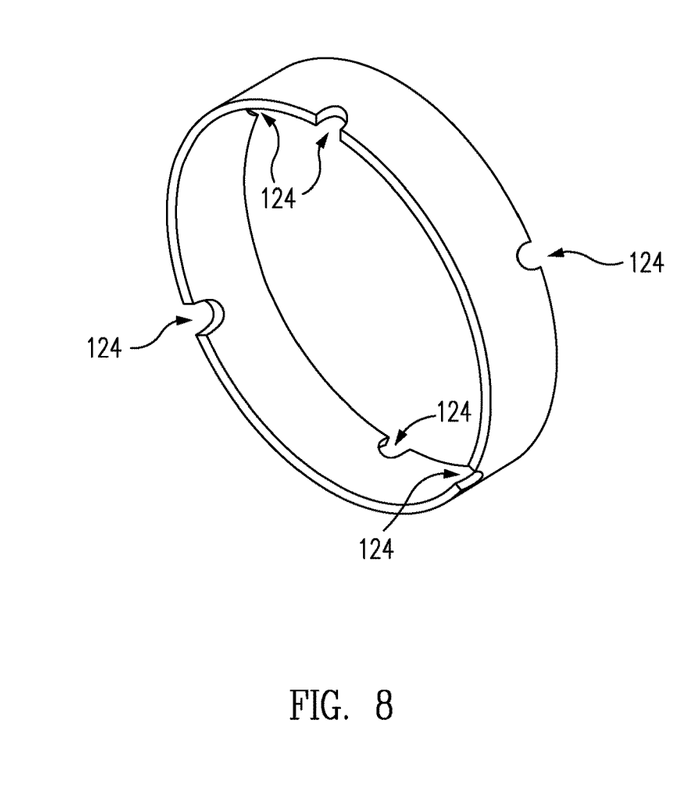
Figure 9:
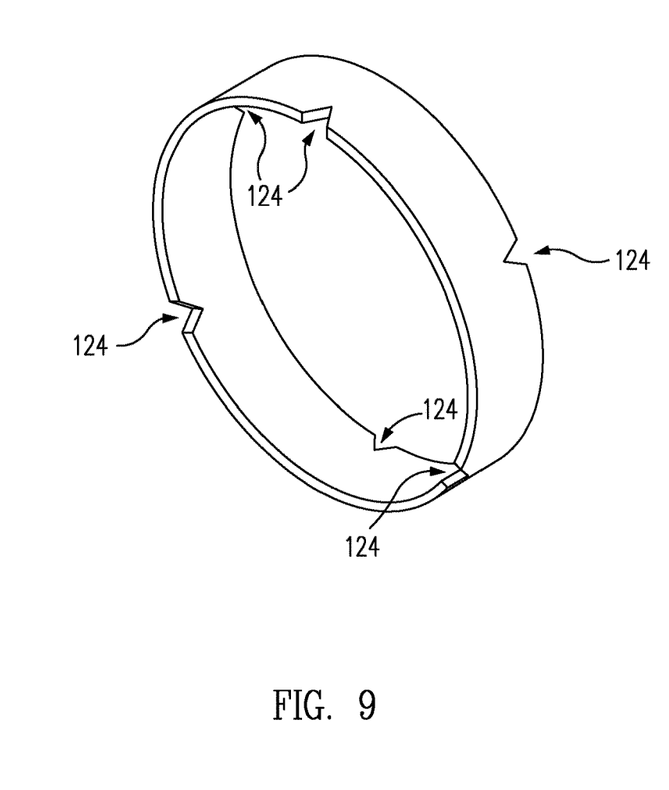

In the particular examples illustrated in FIGS. 6, 8, and 9, the spacer 110 includes three apertures 124 in each of the front and rear ends thereof, with three apertures 124 provided on each end and distributed around the circumfery of the end of the spacer 110 in substantially equal angular increments of about 120 degrees. As also illustrated, the apertures 124 on opposite ends of the spacer may be offset (e.g., rotated) about 60 degrees relative to each other. However, it should be understood that the number, size, shape and arrangement of the apertures 124 can vary, depending on the particular suppressor 100. For example, FIG. 7 illustrates additional apertures 124 distributed about the circumfery of a spacer 110.

It has been determined by the present inventors that providing apertures 124 advantageously improves performance of suppressor 100. In particular, the directing of combustion gases through apertures 124 results in reduced blowback of such combustion gases into an attached firearm. This has the beneficial result of reducing ejection port flash, such as the flash escaping from an ejection port 199 of rifle 101 (see FIG. 1).

FIG. 6 is a front, upper and left side isometric view of a subassembly of the baffle/spacer stack of the suppressor 100, including three baffles 108 and three spacers 110 disposed in an alternating, coaxial abutment with each other, showing an example arrangement of the respective circumferential apertures 124 of spacers 110 and central openings 126 of baffles 108.

Figure 5:
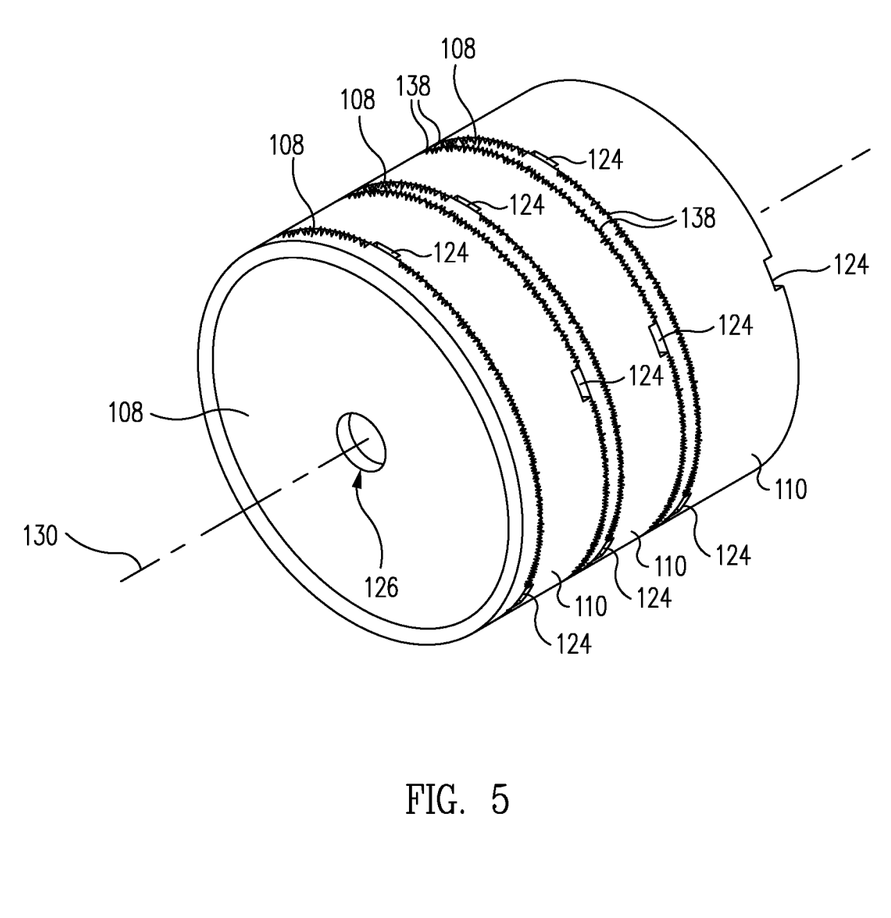
FIG. 5 is a front, upper, and left side isometric view of a subassembly of the suppressor of FIG. 4, including three baffles and three spacers welded in an alternating, coaxial abutment with each other in accordance with an embodiment of the present disclosure.

Various types of baffles 108 may be used adjacent to spacers 110. For example, in the illustrated embodiments, the central opening 126 is concentric with the path taken by a projectile fired through the suppressor 100, and accordingly, is disposed in coaxial alignment with the respective central openings 126 of the other baffles 108 of the suppressor 100. As illustrated in FIGS. 2 and 5, the central openings 126 of the baffles 108 are thus disposed concentrically relative to a central axis 130 of the suppressor 100 and in coaxial alignment with each other, and collectively, define an interrupted central bore 132 of the suppressor 100, as indicated by the dashed lines therein. Additional apertures and/or shapes may be used for baffles 108 and/or spacers 110 as appropriate for various applications.

It has been determined by the present inventors that the various components of the suppressor 100 can be assembled more reliably, accurately, and cost-effectively over prior known approaches by using laser beam welding techniques described in more detail herein.

As discussed with regard to FIG. 4, various components of suppressor 100 may be welded together to provide a weldment 134. For example, the weldment 134 of FIG. 4 may be a single, unitary structure that can be obtained by welding together various suppressor components, such as the front plate 106, the stack of alternating baffles 108 and spacers 110, the blast deflector 120, and the back end member 112, in accordance with various techniques described herein. In particular, it can be noted in, e.g., FIGS. 3, 4, and 5, that the abutting ends of axially adjacent parts of the suppressor 100 define a series of spaced interfaces (e.g., seams) such that welds 138 (e.g., circumferential joints) can be formed at each of these seams to provide the weldment 134 of FIG. 4.

For example, as shown in FIG. 4, a first weld 138A is provided at the interface of forward spacer 110A and a baffle 108. A second weld 138B is provided at the interface of rearward spacer 110B and baffle 108. Additional welds may be provided at the interfaces of various components of suppressor 100 as illustrated. In some embodiments, separate welds 138 may be performed for each interface. In some embodiments, single welds may overlap over multiple interfaces (e.g., welds 138A and 138B may be replaced by a single weld spanning across portions or forward spacer 110A, baffle 108, and/or rearward spacer 110B.

Figure 10:
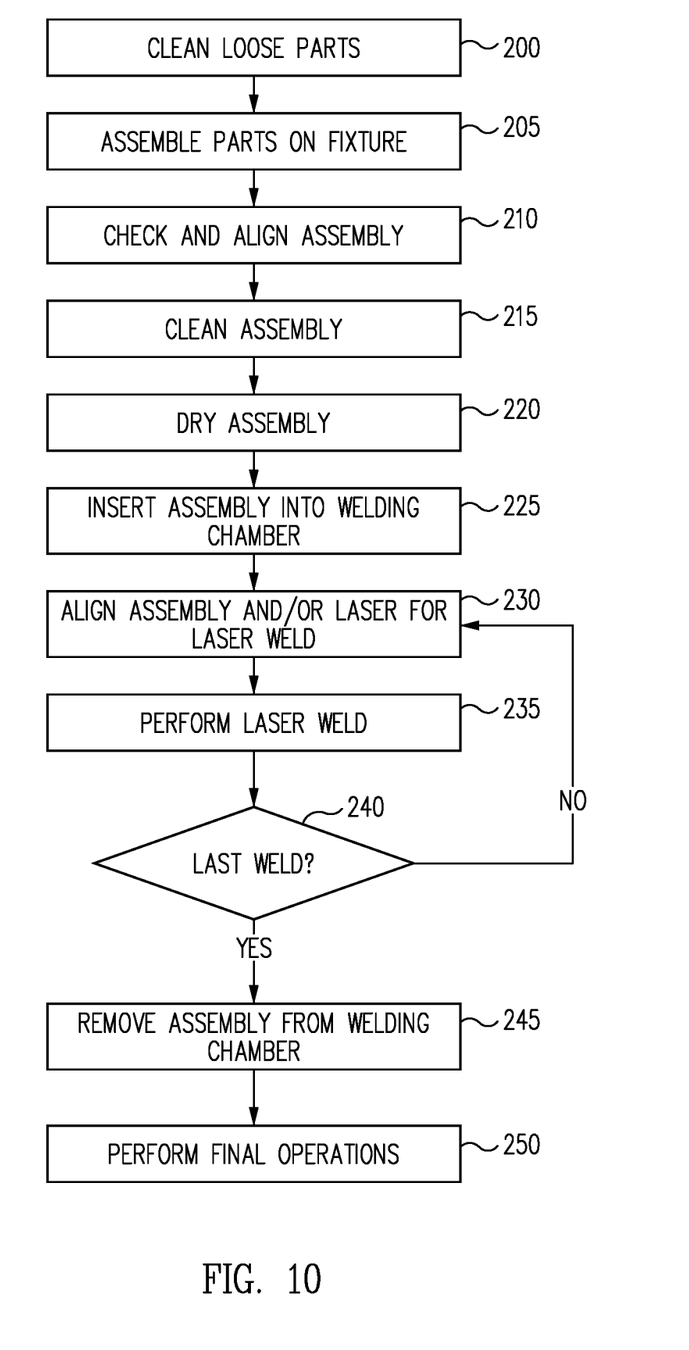
FIG. 10 illustrates an example embodiment of a process for making a firearm sound suppressor in accordance with an embodiment of the present disclosure.
Figure 11:
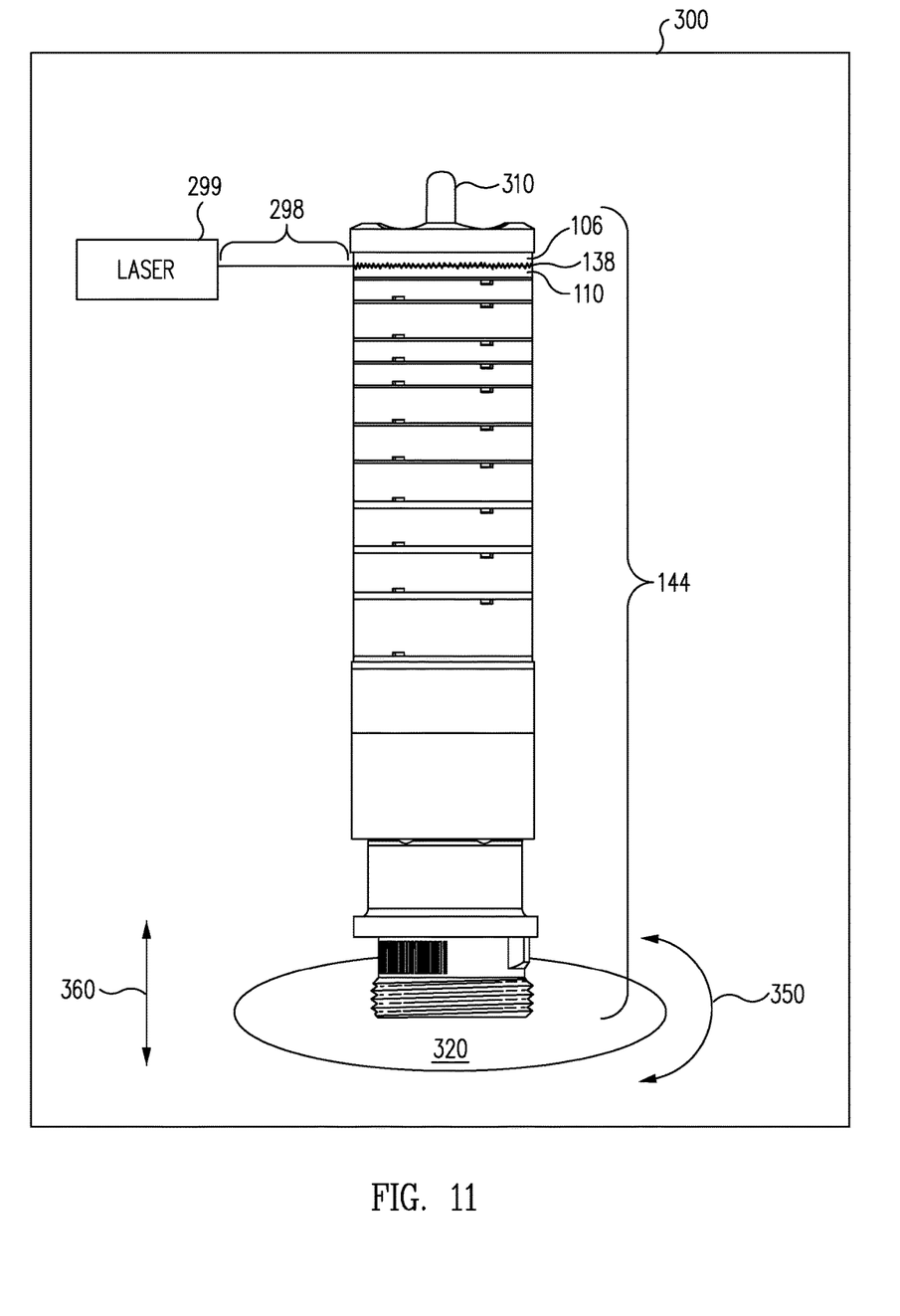
FIG. 11 illustrates a laser welding operation performed on a firearm sound suppressor during the process of FIG. 10 in accordance with an embodiment of the present disclosure.

FIG. 10 illustrates an example embodiment of a process for making (e.g., manufacturing) a firearm sound suppressor 100 in accordance with the present disclosure. The example process can include providing the various separate loose parts (e.g., components) of the suppressor 100 to be welded, including a front plate 106, a plurality of baffles 108, a plurality of spacers 110, a blast deflector 120, a back end member 112, and/or other parts as appropriate. As illustrated in FIG. 11, at operation 200, the loose individual parts are cleaned (e.g., a bath of acetone, or another solvent effective to remove any grease or oils from their surfaces).

At operation 205, the loose parts are assembled (e.g., concentrically onto a fixture, e.g., in the following or in a reverse order: the front plate 106, the stack of alternating baffles 108 and spacers 110, the blast deflector 120, and the back end member 112. The fixture can comprise, for example, an elongated spindle or mandrel having a long, central axis corresponding to the central axis 130 of the suppressor 100, and a temporary, removable tubular alignment sleeve having an internal diameter slightly greater than the outside diameters of the baffles 108 and spacers 110 that is disposed concentrically about the central axis of the mandrel.

The central openings 126 of the front plate 106, the baffles 108 and the back end member 112 are disposed concentrically over the mandrel of the fixture, and the spacers 110 and the blast deflector 120 are disposed concentrically within the temporary sleeve of the fixture, such that opposing ends of the respective parts are held in abutment with each other and circumferential surfaces of the respective parts are coaxially aligned with each other relative to the central axis of the fixture (e.g., the fixture may extend along central axis 130 through interrupted central bore 132 shown in FIG. 5).

At operation 210, the assembled parts are checked for alignment (e.g., by rotating the assembly on the fixture) and adjusted as appropriate, after which they may be clamped together firmly in the axial direction upon the mandrel of the fixture, at which point the tubular alignment sleeve of the fixture can be removed.

At operation 215, the assembly is preferably cleaned again (e.g., in a solvent to remove any grease, oils, or other contaminants accumulated during the operation 210). At operation 220, the cleaned assembly is dried, e.g., in an oven, to remove any solvent residue.

At operation 225, the assembly is inserted into a laser welding chamber. For example, in FIG. 11, an assembly 144 is illustrated as positioned on an example fixture 310 within a laser welding chamber 300. In various embodiments, the assembly 144 may be translated (e.g., rotated, raised, and/or lowered in the directions of arrows 350 and/or 360) relative to a fixed laser (e.g., laser 299 illustrated in FIG. 11) to permit various circumferential welds 138 to be performed. For example, in some embodiments, the laser welding chamber 300 may include laser 299, a turntable 320, and/or a movable fixture 310. In some embodiments, laser 299 can be translated instead of, or in addition to, the assembly 144.

At operation 230, the assembly 144 is aligned relative to the laser 299 to effect a first one of welds 138 using a laser beam 298 provided by laser 299 (see FIG. 11). At operation 235, the first weld 138 is performed (e.g., by rotating the assembly 144 on turntable 320 relative to the laser 299 and/or rotating the laser 299 around the assembly 144).

In this regard, it should be recalled from the above that selected ones of the spacers 110 incorporate circumferential apertures 124 disposed in one, the other or both of front and rear ends thereof. In some embodiments, welds 138 may be made exclusive of these apertures 124 (e.g., laser beam 298 may be deactivated and/or redirected whenever the laser 299 encounters an aperture 124, and then reactivated and/or redirected after the aperture 124 has rotated past the laser beam 298). Thus, in some embodiments, welds 138 may be discontinuous about the circumfery of assembly 144. For example, in some embodiments, a weld 138 may be implemented by separate welds provided in three discontinuous arcs of approximately 120 degrees between apertures 124 bordering an interface of adjacent components (e.g., in some embodiments, apertures 124 may define the discontinuities between the separate welds). In some embodiments, the discontinuities (e.g., gaps between welds) and the circumferential diameter of apertures 124 may be in a range of approximately 0.1 inches to approximately 0.2 inches. However, any desired gap may be provided.

Discontinuous welds provide increased reliability for suppressor 100. For example, if one discontinuous portion of a weld 138 fails (e.g., within an approximately 120 degree arc between two apertures 124), the remaining two discontinuous portions of the weld 138 about the circumfery may remain intact. Although discontinuous welds are illustrated as terminating in relation to apertures 124, discontinuities may be provided at any portion of the circumfery of the various welded components.

At operation 240, a decision is made as to whether all of the welds 138 have been completed, and if not, the process can return to operation 230, at which time the assembly 144 and/or the laser 299 is repositioned to effect the next weld 138, and so on, until the last weld 138 has been effected. In various embodiments, operations 230 through 240 may be performed using computer-controlled automation, particularly if optical feedback of information is provided. Thus, in some embodiments, the entire assembly 144 can be welded automatically, whereas, in other embodiments, each weld 138 can be automated, with manual intervention being applied between successive welds 138 to adjust the position of the assembly and/or the laser 299.

At operation 245, the assembly 144 (e.g., now corresponding to a completed weldment 134) is removed from the welding chamber. At operation 250, various final operations may be performed including, for example, inspecting welds 138 visually and/or otherwise to ensure their integrity, removing the assembly 144 from fixture 310, installing the weldment 134 in tubular housing 102, attaching retaining mechanism 104 to back end member 112, and/or performing additional welds (e.g., in some embodiments, the tubular housing 102 can be welded to front plate 106 and back end member 112 at locations 140, and/or other components as appropriate).

The various laser welding techniques described herein provide significant improvements over conventional welding techniques. In particular, laser welding can be performed much more rapidly (e.g., approximately 30 seconds per suppressor 100 in some embodiments) than conventional arc welding or gas welding, which reduces the overall welding time as well as the overall heat exposure time experienced by the various welded components. As a result, the laser welded components do not experience significant bending, warping, or other misalignment as is common with conventional techniques. Thus, corrective realignment is not required after each laser weld operation, which further reduces labor and overall manufacture time.

As also discussed, the use of discontinuous welds advantageously improves reliability of suppressor 100. In addition, the provision of apertures 124 in spacers 110 advantageously reduces the blowback of such combustion gases into an attached firearm (e.g., rifle 101) and reduces ejection port flash.

As those of some skill in this art will appreciate, and depending on the particular application at hand, many modifications, substitutions and variations can be made in and to the materials, apparatus, configurations and methods of assembling the firearm sound suppressors of the present disclosure without departing from the spirit and scope of the invention. In light of this, the scope of the present invention should not be limited to those of the particular embodiments illustrated and described herein, as they are merely by way of some examples thereof, but rather, should be fully commensurate with that of the claims appended hereafter and their functional equivalents.

What is claimed is:

1. A sound suppressor for a firearm, the suppressor comprising:
    a substantially circular baffle;
    a substantially circular spacer abutted to the baffle;
    a first substantially circular circumferential laser weld joining the baffle and the spacer and extending about a first portion of a perimeter of the spacer and the baffle; and
    a second substantially circular circumferential laser weld joining the baffle and the spacer and extending about a second portion of the perimeter of the spacer and the baffle, wherein the first and second welds are distinct welds.

2. The suppressor of claim 1, wherein the spacer is a first spacer abutted to a front side of the baffle, the suppressor further comprising:
    a second spacer abutted to a rear side of the baffle; and
    a third circumferential laser weld joining the baffle and the second spacer.

3. The suppressor of claim 1, wherein the spacer is a first spacer abutted to a front side of the baffle, the suppressor further comprising a second spacer abutted to a rear side of the baffle and joined to the baffle by the first weld and/or the second weld.

4. The suppressor of claim 1, further comprising:
    a substantially tubular housing surrounding the baffle and the spacer;
    wherein the housing and the spacer define an annular volume surrounding the spacer;
    an aperture in a circumfery of the spacer; and
    wherein the aperture is adapted to direct combustion gases in a radial direction from within the spacer into the annular volume to reduce ejection port flash of the firearm.

5. The suppressor of claim 4, further comprising a plurality of the apertures distributed about the circumfery of the spacer.

6. The suppressor of claim 4, wherein the baffle is a first baffle, wherein the aperture is a first aperture positioned at a first end of the spacer abutting the first baffle, the suppressor further comprising:
    a second baffle abutted to a second end of the spacer; and
    a second aperture positioned at the second end of the spacer.

7. The suppressor of claim 6, wherein the first aperture is offset approximately 60 degrees from the second aperture about the circumfery of the spacer.

8. The suppressor of claim 1, wherein the first weld and/or the second weld is an arc extending approximately 120 degrees about a circumfery of the spacer.

9. The suppressor of claim 1, further comprising:
    a substantially tubular housing surrounding the baffle and the spacer;
    wherein the housing and the spacer define an annular volume surrounding the spacer;
    an aperture in the circumfery of the spacer defining a discontinuity between the first and second welds; and wherein the aperture is adapted to direct combustion gases in a radial direction from within the spacer into the annular volume to reduce ejection port flash of the firearm.

10. The suppressor of claim 9, wherein the aperture has a diameter in a range of approximately 0.1 inches to approximately 0.2 inches.

11. The suppressor of claim 1, further comprising:
a plurality of baffles;
a plurality of spacers;
a substantially tubular housing surrounding the baffles and the spacers;
wherein the housing and the spacers define an annular volume surrounding the spacers;
an aperture in a circumfery of at least one of the spacers; and
wherein the aperture is adapted to direct combustion gases in a radial direction from within the spacer into the annular volume to reduce ejection port flash of the firearm.

12. A method comprising:
providing a plurality of substantially circular baffles and substantially circular spacers of a sound suppressor for a firearm;
aligning the baffles and spacers on a fixture to provide an assembly;
operating a laser to provide a first substantially circular circumferential weld joining a substantially circular first baffle of the plurality of baffles and a substantially circular first spacer of the plurality of spacers and extending about a first portion of a perimeter of the first spacer and the first baffle; and
operating the laser to provide a second substantially circular circumferential weld joining the first baffle and the first spacer and extending about a second portion of the perimeter of the first spacer and the first baffle, wherein the first and second welds are distinct welds.

13. The method of claim 12, further comprising rotating the assembly in relation to the laser during the operating.

14. The method of claim 12, wherein the first spacer is abutted to a front side of the first baffle, the method further comprising operating the laser to provide a third circumferential weld joining the first baffle to a second spacer abutted to a rear side of the first baffle.

15. The method of claim 12, wherein the first spacer is abutted to a front side of the first baffle, wherein the first weld and/or the second weld further joins the first baffle to a second spacer abutted to a rear side of the first baffle.

16. The method of claim 12, further comprising:
inserting the assembly into a substantially tubular housing of the suppressor;
wherein the housing and the spacer define an annular volume surrounding the spacer; and
wherein an aperture in a circumfery of the first spacer is adapted to direct combustion gases in a radial direction from within the first spacer into the annular volume to reduce ejection port flash of the firearm.

17. The method of claim 16, wherein a plurality of the apertures are distributed about the circumfery of the first spacer.

18. The method of claim 16, wherein the aperture is a first aperture positioned at a first end of the first spacer abutting the first baffle, wherein a second aperture is positioned at a second end of the first spacer abutted to a second baffle.

19. The method of claim 18, wherein the first aperture is offset approximately 60 degrees from the second aperture about the circumfery of the first spacer.

20. The method of claim 12, wherein the first weld and/or the second weld is an arc extending approximately 120 degrees about a circumfery of the first spacer.

21. The method of claim 12, further comprising:
inserting the assembly into a substantially tubular housing to surround the baffles and the spacers;
wherein the housing and the spacers define an annular volume surrounding the spacers;
wherein an aperture in a circumfery of the first spacer defines a discontinuity between the first and second welds; and
wherein the aperture is adapted to direct combustion gases in a radial direction from within the first spacer into the annular volume to reduce ejection port flash of the firearm.

22. The method of claim 21, wherein the aperture has a diameter in a range of approximately 0.1 inches to approximately 0.2 inches.

23. A method comprising:
providing a sound suppressor comprising:
a plurality of substantially circular baffles,
a plurality of substantially circular spacers, each of the plurality of spacers abutted to at least one of the plurality of baffles, wherein each of the plurality of baffles is joined to at least one of the plurality of spacers via a first substantially circular circumferential laser weld extending about a first portion of a perimeter of the spacer and the baffle and a second substantially circular circumferential laser weld extending about a second portion of the perimeter of the spacer and the baffle, wherein the first and second welds are distinct welds,
a substantially tubular housing surrounding the baffles and the spacers, wherein the housing and the spacers define an annular volume surrounding the spacers, and
an aperture in a circumfery of at least one of the spacers, wherein the aperture is adapted to direct combustion gases in a radial direction from within the spacer into the annular volume to reduce ejection port flash of a firearm;
cycling the firearm; and
passing combustion gases in the radial direction from within the spacer into the annular volume.

* * * * *